(No Model.)
A. SMITH.
SEEDER.
No. 452,623. Patented May 19, 1891.
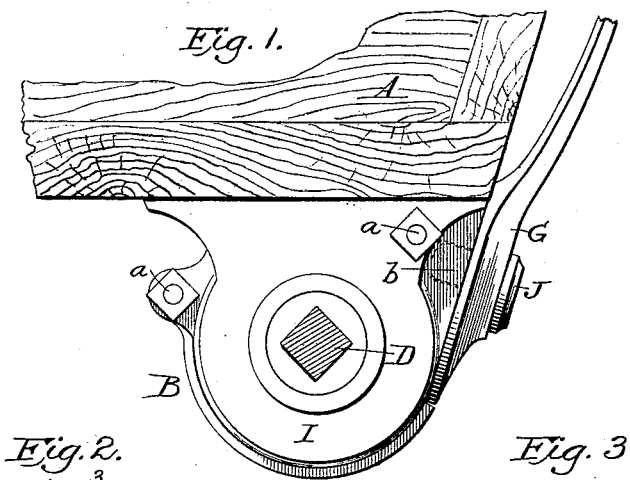
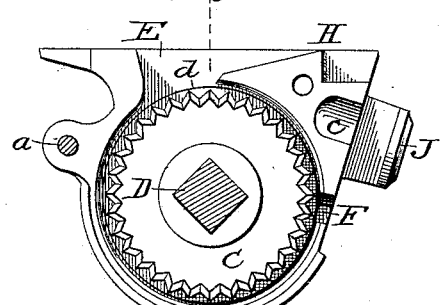
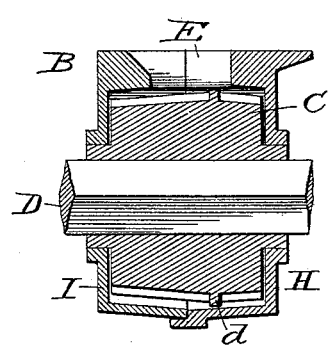
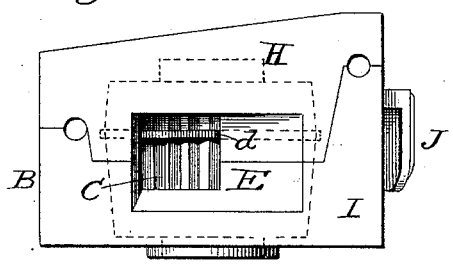
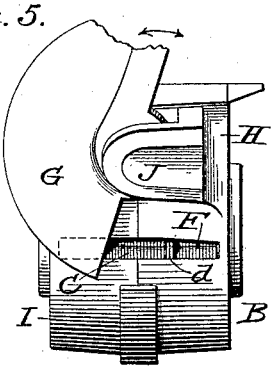
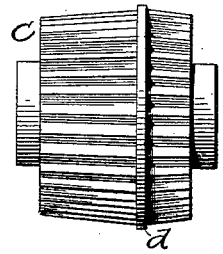
Witnesses:
James F. Duhamel.
Horace A. Dodge.
Inventor:
Alexander Smith,
by Dodge & Sons,
Attys.
THE NORRIS PETERS CO., PHOTO-LITHO., WASHINGTON, D. C.

UNITED STATES PATENT OFFICE.

ALEXANDER SMITH, OF PHELPS, NEW YORK, ASSIGNOR OF ONE-HALF TO THE CROWN MANUFACTURING COMPANY, OF SAME PLACE.

SEEDER.

SPECIFICATION forming part of Letters Patent No. 452,623, dated May 19, 1891.

Application filed February 27, 1891. Serial No. 383,100. (No model.)

*To all whom it may concern:*

Be it known that I, ALEXANDER SMITH, a citizen of the United States, residing at Phelps, in the county of Ontario and State of New York, have invented certain new and useful Improvements in Seeders, of which the following is a specification.

My invention relates to seeders designed particularly for sowing grass-seed, and has reference more particularly to that class of seeders in which a ribbed or grooved rotary feed-wheel mounted within a shell or casing acts upon the seed and carries or forces it out through a suitable discharge-opening.

In machines for sowing grass there is employed a long hopper, to the under side of which and over the openings in the bottom thereof is applied a series of distributers or feed-cups such as are herein shown and described, said distributers or feed-cups having their valves or gates connected one with the other, so that they may be operated simultaneously. Such an arrangement as I have just referred to is that which is preferred; but I wish it understood that the invention is susceptible of sowing other seed than grass-seed—such, for instance, as oats, barley, wheat, &c.—with but slight variations in the proportions of the parts. A good grass-seeder must be a small and light distributer with a capacity to sow a very small quantity of seed (say two quarts or a quantity equal to about one bushel per acre) evenly and always uniform and alike, one that is readily adjusted and will stop running when the machine stops. Another important quality in such seeders is that it shall sow alike in whatever position the machine is placed in running over hills or roughnesses. These various qualifications are secured in the construction shown in the drawings, in which—

Figure 1 is a side view of my improved feed-cup, with the driving-shaft in section and the upper end of the cut-off or gate broken off; Fig. 2, a similar view with one-half of the shell or casing removed and looking at the end of the distributer-wheel; Fig. 3, a vertical sectional view on the line 3 3 of Fig. 2; Fig. 4, a top plan view; Fig. 5, a rear face view, and Fig. 6 a view of the feed-wheel.

A indicates the hopper of the machine; B, the cup-shell or casing of the distributer, secured to the under side of the hopper, as usual; C, the rotary feed-wheel or distributer mounted within the shell or casing; D, the shaft for imparting motion to the feed-wheel; E, the inlet-opening for the seed; F, the discharge-opening, and G the cut-off gate or valve which works over the discharge-opening.

The shell or casing B comprises two parts or castings H and I, united by bolts or screws *a*, as shown in Figs. 1 and 2. Both parts H and I are cut away at their upper meeting edges to form the inlet or feed opening. Both are slotted at the rear to form the discharge-opening F, and both are provided with a circular hole or opening to receive the reduced ends of the distributing or feed wheel. One of the parts H is provided with an L-shaped arm J upon its rear wall, which bears against the rear face of the main body of the valve or gate G, as shown in Figs. 1 and 5. This valve or gate G is provided with a stud or journal *b*, (shown in dotted lines in Fig. 1,) which enters a seat *c*, formed in the contiguous walls of the shell-sections, as shown in Fig. 2. The valve being placed in position as the parts are assembled will be held in position without the use of any devices except those used to hold the parts of the shell together. The body of the gate or valve works over the discharge-opening as it swings upon its stud or pivot, and by covering or uncovering a greater or less portion of the opening F regulates the feed or discharge.

It will be noticed upon reference to Figs. 2 and 3 that the periphery of the feed-wheel C is not parallel with the axis of rotation, but tapers from the ends upward and inward, the greatest diameter being about one-third of the distance from one end, so as to form a short and a long section divided by a circumferential ring or flange *d*. The periphery of the wheel C is formed into ∧-shaped ribs having the same general direction of the shaft D, as shown in Figs. 2, 3, 4, and 5.

The interior of the casing B is made to conform to the general shape of the feed-wheel—that is, the inner walls of the casing are approximately parallel with the periphery of the wheel.

Upon reference to Fig. 5 it will be seen that the discharge-opening F also conforms in a measure to the form of the feed-wheel or distributer—that is to say, the width or height of the opening tapers or decreases from a point opposite the ring $d$ or greatest diameter of the wheel toward the end of the slot or opening, so as to conform to the taper of the short section of the wheel. The other portion of the slot or opening F is of uniform or of gradually-increasing width, as may be desired.

In sowing the full capacity of the seeder the valve or gate will be thrown over to such position as to uncover the whole slot; but when it is desired to sow a smaller quantity the gate will be brought to the position shown in Fig. 5. In order to secure a still smaller feed, the gate will be made to cover all the slot except the tapering portion thereof, and thereby render active only the short section of the feed-wheel and its corresponding discharge-opening. By extending the arm of the gate upward, as shown, I secure an ease and nicety of adjustment.

Having thus described my invention, what I claim is—

1. In combination with a shell or casing B, having inlet and outlet openings and a chamber tapering from the center toward the sides, the distributing-wheel C, mounted in the chamber and tapered toward its ends.

2. In combination with a shell or casing having inlet and outlet openings, the distributer-wheel C, having a doubly-tapered periphery and of greatest diameter at a point to one side of its center.

3. In combination with a shell or casing having a tapering discharge-opening, a tapering feed-wheel, and a gate or cut-off.

4. In combination with the shell-sections H and I, the former provided with an L-shaped arm J and both having a semicircular seat, the cut-off or gate having a stud or journal to fit into the seat, and means for clamping the sections H and I together.

5. In combination with a shell or casing, the distributing-wheel C, having a straight periphery tapering toward its ends.

6. In combination with a shell or casing having an unobstructed chamber extending from side to side, the distributing-wheel C, having its periphery tapering toward its ends and provided with a circumferential flange $d$, adapted to divide the chamber into two compartments.

In witness whereof I hereunto set my hand in the presence of two witnesses.

ALEXANDER SMITH.

Witnesses:
EDWARD H. LEGGETT,
E. F. NEEDHAM.